United States Patent [19]

Sypula et al.

[11] Patent Number: 5,445,720
[45] Date of Patent: Aug. 29, 1995

[54] SUBSTRATES, BELTS AND ELECTROSTATOGRAPHIC IMAGING MEMBERS, AND METHODS OF MAKING

[75] Inventors: Donald S. Sypula; Joseph Mammino, both of Penfield; Bela Richter, Honeyoye Falls, all of N.Y.

[73] Assignee: Xerox Corporation, Stamford, Conn.

[21] Appl. No.: 24,974

[22] Filed: Mar. 2, 1993

Related U.S. Application Data

[62] Division of Ser. No. 574,082, Aug. 29, 1990, abandoned.

[51] Int. Cl.⁶ ............................................. C25D 13/04
[52] U.S. Cl. ............................ 204/181.1; 204/180.9; 427/405
[58] Field of Search .............. 204/181.1, 180.9, 180.2; 205/198; 427/405

[56] References Cited

U.S. PATENT DOCUMENTS

| | | | |
|---|---|---|---|
| 3,597,266 | 8/1971 | Leibowitz et al. | 117/130 E |
| 3,615,736 | 10/1971 | Stone | 106/1 |
| 3,672,938 | 6/1972 | Zeblisky | 117/47 A |
| 3,850,733 | 11/1974 | Szabo | 204/180.9 |
| 3,871,889 | 3/1975 | Fadgen, Jr. et al. | 106/1 |
| 3,876,510 | 4/1975 | Wallin et al. | 204/216 |
| 3,927,463 | 12/1975 | Dupree et al. | 204/216 |
| 3,950,839 | 4/1976 | Dupree et al. | 204/216 |
| 4,067,782 | 1/1978 | Bailey et al. | 205/151 |
| 4,098,654 | 7/1978 | Helle et al. | 204/181.1 |

(List continued on next page.)

FOREIGN PATENT DOCUMENTS 731042   3/1966  Canada .
0271466  6/1988  European Pat. Off. .

OTHER PUBLICATIONS

"Additive for chromic-acid-type etchants for plating on plastics", Enplate Q/519, Enthone, Inc. Sales Brochure. (No date available).

"Neutralizer/accelerator for plating on plastics", Enplate PA-492, Enthone, Inc. Sales Brochure, issued Feb. 1980.

"Activator for thru-hole plating of printed circuit boards", Enplate Activator 443, Enthone, Inc. Sales Brochure, issued Dec. 1982.

"Electroless nickel bath for plating on plastics", Enplate NI-414, Enthone, Inc. Sales Brochure, issued Apr. 1974.

"Post activator for electroless plating", Enplate PA-491, Enthone, Inc. Sales Brochure. (No date available).

"Non-silicated soak cleaner and chromium reducer for plastics and other non-conductors", Enplate PC-452, Enthone, Inc. Sales Brochure, issued Jul. 1978.

"High-speed, room-temperature electroless copper plating process for plating on plastics", Enplate CU-750, Enthone, Inc. Sales Brochure, issued May 1978.

"Cleaner/conditioner for printed circuit boards", Enplate PC-456, Enthone, Inc. Sales Brochure. (No date available).

(List continued on next page.)

Primary Examiner—John Niebling
Assistant Examiner—Kishor Mayekar
Attorney, Agent, or Firm—Oliff & Berridge

[57] ABSTRACT

A process for fabricating a substrate includes the steps of (a) immersing a molding article having an electrically conductive molding surface in an electrodeposition liquid comprising polymer particles and a nucleating material; (b) electrodepositing a coating on the molding article; and (c) coalescing the coating to form a substrate containing the nucleating material. The process may further include exposing the substrate to an electroless metal plating bath to form a metal layer on the substrate. A process for fabricating an electrostatographic imaging member includes electrolessly depositing metal on a substrate. A process for fabricating a belt comprises electrolessly depositing metal on an endless substrate. An electrostatographic imaging member comprises a substrate including polymer and nucleating material and a metal layer. An endless belt includes polymer and nucleating material.

18 Claims, No Drawings

U.S. PATENT DOCUMENTS

| | | | |
|---|---|---|---|
| 4,270,656 | 6/1981 | Chesmer et al. | 474/205 |
| 4,554,182 | 11/1985 | Bupp et al. | 427/304 |
| 4,686,016 | 8/1987 | Held | 204/25 |
| 4,747,992 | 5/1988 | Sypula et al. | 264/130 |
| 4,758,486 | 7/1988 | Yamazaki et al. | 430/56 |
| 4,772,253 | 9/1988 | Koizumi et al. | 474/266 |
| 4,952,293 | 8/1990 | Sypula et al. | 204/181.1 |
| 5,064,509 | 12/1991 | Melnyk et al. | 204/181.1 |

OTHER PUBLICATIONS

"No-rerack process for plating on ABS using electroless nickel (may also be used for bulk treatment through electroless plating)", Enplate Plating Cycle #32, Enthone, Inc. Sales Brochure, issued Jun. 1982.

"No-rerack process for plating on ABS using high speed electroless copper (may also be used for bulk treatment through electroless plating)", Enplate Plating Cycle #32A, Enthone, Inc. Sales Brochure, issued Mar. 1982.

"No-rerack process for plating on noryl or ABS and noryl using electroless nickel (may also be used for bulk treatment through electroless plating)", Enplate Plating cycle #36, Enthone, Inc. Sales Brochure, issued Jun. 1982.

"No-rerack process for plating on noryl or ABS and noryl using high-speed electroless copper (may be used for bulk treatment through electroless playing)", Enplate Plating Cycle #36A, Enthone, Inc. Sales Brochure, issued Jun. 1982.

SUBSTRATES, BELTS AND ELECTROSTATOGRAPHIC IMAGING MEMBERS, AND METHODS OF MAKING

This is a Division of application Ser. No. 07/574,082 filed Aug. 29, 1990, now abandoned.

BACKGROUND OF THE INVENTION

The assignee of the present application has engaged in research and development of electrodeposition of polyvinyl fluoride for the production of seamless belts and dielectric receivers. This technology uses the electrodeposition of a high solids polymer dispersion to obtain thick polymer films using non-complex equipment with low overall cost. The polymer dispersions can include polyvinyl fluoride (PVF) such as is sold by E.I. du Pont De Nemours & Co. under the name Tedlar ® (including 33% by weight solids) or polyvinylidene difluoride (PVDF) such as is sold by Pennwalt Corp. under the name Kynar ® (including 45% by weight solids). The dispersions are diluted with an appropriate solvent, and a condition chemical agent or solvent is added to obtain a uniform electrodeposited film.

The equipment typically used for such electrodeposition includes a conventional low voltage power supply, a metal mandrel having the appropriate dimensions for the seamless belt to be prepared, a metal or other appropriate counterelectrode and a tank to contain the dispersion. The dispersion is placed into the tank and the mandrel is then set in place with the counterelectrode placed in the center of the mandrel from top to bottom. Voltage is applied to the mandrel and counterelectrode with such a polarity as to electrodeposit the dispersion on the inside of the mandrel. For PVF, the mandrel acts as the cathode and for PVDF, the mandrel acts as the anode. After electrodeposition, the mandrel is removed from the dispersion and placed in an oven at an appropriate temperature to coalesce the dispersion particles to form a film and evaporate the solvent to give a dry, uniform film. Then, the mandrel is removed from the oven and allowed to cool to room temperature, after which the seamless belt is removed from the mandrel.

These seamless belts are not conductive and if they are to be used as photoreceptor substrates or dielectric receiver belts, a conductive coating of some type must be applied by an additional process step. For example, the assignee of the present application has developed a procedure in which a metal such as nickel is electrodeposited as a thin layer on the inside of a mandrel to form a conductive layer. Next, a polymer layer, e.g., PVF or PVDF, is electrodeposited to give mechanical stability, to form a photoreceptor substrate which may then be removed from the mandrel. After heating in an oven and cooling, the seamless belt with a thin metal coating is removed from the mandrel to give a conductive seamless belt. This process has disadvantages, e.g., it is necessary to electrodeposit a thin removable metal film on the inside of the mandrel. In addition, the mandrel may have to be passivated in some way so that the thin metal film does not permanently adhere to the mandrel surface. These process steps add to the overall cost of the conductive seamless belt.

U.S. Pat. No. 4,686,016 discloses a method of electrodepositing a metal coating onto a surface of an endless belt. An annular bath is formed by a pair of concentrically arranged endless belts and an aqueous electrolytic solution is filled into the annular bath. An anode is supported in the bath and one of the endless belts forms a cathode. The anode and cathode are connected to a constant voltage source and a metal coating is deposited on the belt acting as a cathode.

U.S. Pat. No. 4,758,486 discloses an endless belt-shaped electrophotographic photoconductor comprising a support material and an electroconductive layer deposited thereon by vacuum evaporation. The electroconductive overcoating layer may comprise a polymeric material having a glass transition temperature of −10° C. or lower.

U.S. Pat. No. 4,270,656 discloses a method of forming a rubber and fabric feed belt comprising the steps of mounting a sleeve on a mandrel, placing the mandrel in a mold, pouring rubber into the mold, removing the formed belt, subjecting the belt to a halogenation treatment, and grinding the outer surface of the belt.

U.S. Pat. Nos. 3,927,463, 3,950,839 and 4,067,782, disclose various methods of forming an electroforming mandrel used in the production of endless seamless nickel xerographic belts.

SUMMARY OF THE INVENTION

It is an object of the present invention to provide a process for fabricating substrates, preferably in the form of endless belts. It is also an object of the invention to provide a process for using such substrates in the manufacture of conductive articles which overcome the above-mentioned disadvantages.

It is another object of this invention to provide a process for fabricating a conductive article which does not require electrodeposition of a metal onto the substrate.

These and other objects are accomplished according to the present invention by providing a process comprising immersing a molding article having an electrically conductive molding surface in an electrodeposition liquid comprising polymer particles, preferably fluoropolymer particles, and a nucleating material (also called a film growth catalyzing or film growth initiating material). A coating of the polymer particles and nucleating material is then electrodeposited on the molding article and coalesced to form a substrate, preferably in the form of an endless seamless belt, the substrate containing the nucleating material. Such a substrate can be stored and/or transported while on the mandrel or it can be removed from the mandrel and stored and/or transported.

To form a conductive article which may comprise an electrostatographic imaging member, or which may be used in the manufacture of an electrostatographic imaging member, a substrate as described above is preferably immersed in an electroless metal plating bath and metal is electrolessly deposited from the bath onto the substrate. The substrate preferably has previously been removed from the molding article prior to immersion in the electroless metal plating bath. Alternatively, the electrodeposition liquid can be removed after electrodeposition and the plating bath can be substituted therefor, without first removing the substrate from the molding article, or the substrate and molding article can be moved together from the electrodeposition liquid to the plating bath.

The present invention is also directed to a process comprising electrolessly depositing metal on a substrate, preferably an endless belt, to form an electrostatographic imaging member, preferably a photoreceptor.

The present invention is also directed to electrolessly depositing metal on an endless belt, the belt preferably comprising a substrate for an electrostatographic imaging member.

The present invention is further directed to products formed by the above processes, and to an electrostatographic imaging member comprising a substrate comprising polymer and nucleating material and a metal layer. The invention is also directed to an endless belt comprising polymer and nucleating material.

The invention may be more fully understood with reference to the following description of embodiments and examples. The invention is not limited to the exemplary embodiments and should be recognized as contemplating all modifications within the skill of an ordinary artisan.

DETAILED DESCRIPTION OF THE INVENTION

The present invention relates to the formation of a substrate by electrodepositing a coating on a molding article. The present invention also relates to the application of a conductive metal film to such a substrate using an electroless deposition process. According to a preferred embodiment of the invention, a seamless belt is formed by immersing a molding article comprising a mandrel in an electrodeposition liquid comprising polymer particles and nucleating agent and electrodepositing to form a coating on the molding article.

Suitable materials out of which the molding article may be formed include steel, stainless steel, copper and nickel.

To facilitate removal of the substrate from the molding article after the electrodeposition step, release agents may be applied to the deposition surface of the molding article prior to deposition. Mold release agents such as silicones, fluorocarbons, hydrocarbons, soaps, detergents, surfactants (e.g. Silwet L-7500, Silwet L-7602 from union Carbide Corp., and GAFAC RA600 from GAF Corp.) may be used. A preferred release agent is silicone resin (available as F-544/F-546 from Wacker Silicones Corp., Adrian, Michigan). The F-544 silicone resin is in a solvent vehicle to which the F-546 catalyst is added. An amine component of the catalyst promotes cross-linking of the silicone resin upon solvent evaporation. The mixture is typically heated to promote the reaction.

The electrodeposition liquid preferably comprises from about 10 to about 35 percent by weight of polymer particles, from about 0.01 to about 0.25 percent by weight of nucleating material, from about 0.1 to about 1.0 percent by weight of acid material, from about 0.1 to about 1.5 percent by weight of solvent for the nucleating material (e.g methanol for $PdCl_2$ in HCl), and from about 65 to about 90 percent by weight of one or more carriers (e.g. propylene carbonate).

The polymer particles in the electrodeposition liquid should be capable of forming a dispersion of electrically charged film-forming particles in an organic liquid. Suitable polymers include chloro, bromo or fluoro substituted polyvinyl compounds such as polyvinyl fluoride (e.g., Tedlar ® available from E.I. du Pont De Nemours & Co.), polyvinylidene fluoride (e.g. Kynar 202 ® available from Pennwalt Corp.), polyethylene; polypropylene; polyethers; styrene-butadiene copolymers; polybutylenes; and the like. Typical nonpolar thermoplastic film-forming polymers include polyamides (e.g. nylon); polycarbonates (e.g. Makrolon 5705, available from Bayer Chemical Co., Merlon M39, available from Mobay Chemical Co., and Lexan 145, available from General Electric Co.); polyesters (e.g. PE-100 and PE-200, available from Goodyear Tire and Rubber Co.); polysulfones (e.g. P-3500, available from Union Carbide Corp.); polysulfides; cellulosic resins; polyarylates; acrylics; polyarylsulfones; polyphenylenesulfides; polyurethanes; polyimides; epoxies; poly(amide-imide) (e.g. Torlon Polymer A1830, available from AMOCO Chemical Corp.); copolyesters (Kodar Copolyester PETG 6763 available from Eastman Kodak Co.); polyethersulfones; polyetherimide (e.g. Ultem available from General Electric Co.), polyarylethers; and the like, and mixtures thereof. Polycarbonate polymers derived from 2,2-bis(4-hydroxyphenol)propane, 4,4'-dihydroxy-diphenyl-1,1-ethane, 4,4-dihydroxy-diphenyl-1,1-isobutane, 4,4'-dihydroxy-diphenyl-4,4-heptane, 4,4'-dihydroxy-diphenyl-2,2-hexane, 4,4'-dihydroxy-triphenyl-2,2,2-ethane, 4,4'-dihydroxy-diphenyl-1,1-cyclohexane, 4,4'-dihydroxy-diphenyl——decahydronaphthalene, cyclopentane derivatives of 4,4'-dihydroxy-diphenyl——decahydronaphthalene, 4,4'-dihydroxy-diphenyl-sulphone, and the like, and mixtures thereof may also be suitable.

The polymer particles are preferably fluoropolymer particles, most preferably polyvinyl fluoride and/or polyvinylidene fluoride. Kynar 202 ® is a preferred source of polyvinylidene fluoride (PVDF) and comprises 38.2% by weight PVDF, 6.8% by weight mica (filler) and 55% by weight liquid (i.e. di-methyl phthalate and diisobutyl ketone). Kynar 202 ® has a density of 1.34 gms/ml.

Any suitable nucleating agent may be employed according to the present invention. The most preferred is palladium chloride. Other suitable nucleating agents are stannous chloride and nucleating metals such as finely divided Ni, Al, Cu, Fe and Zn. Care must be taken when handling reactive metals such as finely divided Ni. As a result of the electrodeposition, nucleating agent is incorporated into the polymer such that nucleating agent is present on an exposed surface of the substrate.

The electrodeposition liquid preferably further comprises a carrier, such as propylene carbonate. The carrier is preferably a liquid which maintains the polymer particles in the form of a homogeneous dispersion to enable uniform deposition of the polymer particles on the molding article. Propylene carbonate is a preferred carrier liquid for use with an electrodeposition liquid comprising fluoropolymer. Typical combinations of polymer and organic liquid dispersion medium include polyvinylfluoride and propylene carbonate, isophorone, N-methyl pyrrolidone, N,N-dimethyl formamide, butyrolacetone, dimethyl phthalate, acetophenone, acetyl triethyl citrate, aniline, n-butyl levulinate, dibenzyl ether, dibutyl fumarate, di-n-butyl maleate, dibutyl phthalate, di-n-butyl succinate, dibutyl tartarate, di(2-ethyl hexyl)phthalate, diethyl phthalate, diethyl maleate, diethyl sebacate, dimethyl adipate, dioctyl adipate, ethyl levulinate, quinoline, o-toluidene, triacetin, tributyl citrate, tributyl phosphate, triethyl citrate or triethyl phosphate. Another example of a combination of polymer and organic liquid dispersion medium is polyvinylidene fluoride and butyrolacetone, isophorone, carbitol acetate, methyl isobutyl ketone, n-butyl acetate, cyclohexanone, diacetone alcohol, diisobutyl ketone, ethyl aceto acetate, triethyl phosphate, propylene carbonate, or dimethyl phthalate. Still other examples include combinations of propylene carbonate organic liquid dispersion medium with a polymer of nylon, polyvinyl chloride, polyvinyl chloride-polyvinylidene chloride or polyvinylidene chloride-polyacrylonitrile.

Any suitable solvent such as methanol may be employed in the electrodeposition liquid. A preferred solvent is propylene carbonate.

Methanol may further be used in the electrodeposition liquid to decrease the viscosity of the dispersion and increase the solubility of the nucleating agent. For PVF dispersions, methanol is used as a conditioning additive. Methanol acts as a solvent for $PdCl_2/HCl$. If used, methanol is preferably present in an amount of up to about 10% by volume. A higher volume of methanol in the electrodeposition liquid may tend to decrease the drop in current between the anode and the cathode during the electrodeposition of polymer particles.

It may be preferable to add a small amount of hydrochloric, acetic or other acid to the electrodeposition liquid to promote dissolution of the nucleating agent. The acid should be a strong acid, preferably an inorganic acid. For example, palladium chloride is known to be partially or completely insoluble in some materials. Palladium chloride is soluble in low molecular weight alcohols, e.g., ethanol, methanol and propanol. $PdCl_2$ is usually insoluble in propylene carbonate and non-alcohol organic liquids. Insolubility does not, however, present a problem if the $PdCl_2$ is finely divided and dispersed. The addition of hydrochloric acid tends to cause the electrodeposition liquid to coagulate. Such coagulation may be minimized by addition of an appropriate amount of methanol. The acid is preferably present in a concentration of from about 0.1 to about 1.0 percent by weight of the dispersion.

The voltage applied during the electrodeposition step is preferably within the range of from about 5 volts to about 200 volts. The selection of a preferred voltage depends on several factors. Higher voltages tend to decrease deposition time. Factors which are affected by the voltage include resistance between the electrodes caused by film formation on the mandrel surface. In general, higher voltages are preferred when applying thicker films.

The current applied during the electrodeposition step is preferably within the range from about 0.001 amps to about 0.100 amps. The length of time required for the electrodeposition step is typically from about 0.5 to about 10 min.

Solvent added to the electrodeposition liquid may affect the current produced by a particular voltage. In general, higher concentrations of solvent (e.g., methanol) in the electrodeposition liquid tend to stabilize the current throughout the deposition step. Large concentrations of solvent tend to increase the deposition time.

The electrodeposited coating on the molding article has a thickness of from about 0.25 to about 12 mils, preferably from about 2.5 mils to about 4 mils.

After the electrodeposition step, the electrodeposited coating is coalesced by heating at a temperature from about 140° C. to about 210° C. for from about 5 to about 30 min. PVF films are preferably coalesced at about 180° C. for about 20 min. PVDF films are preferably coalesced at about 210° C. for about 20 min. By virtue of the coalescing step, a substrate is formed which contains the nucleating material. The substrate is preferably dried of organic solvent if it is to be subsequently exposed to an electroless plating bath. In addition, before exposing the substrate to an electroless plating bath, it may be necessary to treat the substrate to expose a sufficiently high level of nucleating agent on the surface of the substrate. For example, such processing may include chemical etching, pumicing or other methods of removing a thin layer from the substrate surface. Typical chemical etching methods include, e.g., treating with concentrated sulfuric acid, treating with a 25% by weight solution of potassium hydroxide in a one to one mixture of ethanol and water, or in hot propylene carbonate, etc.

To form a conductive article, the substrate comprising a polymer layer having nucleating agent incorporated therein is then exposed (preferably by immersing), either while still on the molding article, or after having been removed from the molding article, to a plating bath comprising a solution of metal ions for from about 0.1 to about 0.5 hour depending upon the desired metal layer thickness. The plating bath preferably comprises metal ions, a reducing agent for the metal, a complexing agent, a modifier, and a bath liquid.

Suitable concentrations of the components in the plating bath are well known in the plating art, and are generally within relatively large ranges. One example of a plating bath which has been used for electroless metal deposition contains 0.09M (i.e., molar) metal ion salt (e.g., nickel sulfate), 0.045M reducer (e.g., sodium hypophosphate), 0.18M complexing agent (e.g., sodium chloride), and 0.06M modifier (e.g., sodium succinate). In general, any autocatalytic electroless solution can be used. Nickel solutions are preferred. Manufacturers typically make concentrated plating bath solutions which may be diluted before use.

The nucleating agent (described above) in the substrate develops a seed that, when the substrate is immersed in a plating bath, initiates the electroless deposition of the metal. Thereafter, the electroless deposition process is autocatalytic, continuing to deposit nickel which is available in the bath. This occurs by the catalytic action of the reducing agent on the metal ions in the solution. The amount of nucleating agent in the belt must therefore be sufficient to nucleate a seed to initiate the electroless deposition. Ni deposition is autocatalytic.

Preferred metals for forming the electrolessly deposited layer include nickel, copper and chromium. Other metals which may be used include cobalt, gold, silver, aluminum, zirconium, niobium, tantalum, vanadium, hafnium, titanium, palladium, tungsten, molybdenum, and the like, and mixtures and alloys thereof. The metal is preferably provided in the form of a metal salt, e.g., nickel salt. Preferred metal salts include nickel chloride, nickel sulfate, silver nitrate, silver cyanide, copper sulfate, copper cyanide, gold cyanide, and lithium-/aluminum hydride.

A group of suitable reducing agents for use in plating baths used in the present invention includes sodium hypophosphite, formaldehyde, hydrazine, borohydrides, amine boranes and their derivatives.

Plating baths which may be used in the present invention are typically aqueous, are pH controlled, and are used at temperatures in the range of from about 50° C. to about their boiling point.

A preferred electroless nickel bath for plating on polymer layers comprises Enplate NI-414B (available from Enthone Incorp., West Haven, Conn.). A preferred bath make-up consists of about 1 part by volume of Enplate NI-414B with 16 parts by volume of deionized or distilled water. Such a bath is particularly preferred when palladium chloride is used as the nucleating agent.

The thickness of the conductive layer is generally within a substantially wide range, depending on the optical transparency and flexibility desired for the device. Thickness can be adjusted to provide-optimum electrical conductivity, flexibility and/or light transmission. Conductive layer thicknesses of from about 0.01 micrometer to about 12.5 micrometers are preferred.

To form a conductive belt for, e.g., electrostatographic imaging member applications, as mentioned above, a metal layer is formed on the surface of the substrate by immersing the substrate containing nucleating agent in a solution preferably comprising metal salt and reducing agent. For photoreceptor applications, this metal layer may be used as a ground plane layer. After the deposition has provided a metal film which completely covers the surface of the substrate, the substrate is preferably removed and rinsed with deionized water and dried.

For a flexible photoresponsive imaging device, the thickness of the conductive layer is preferably between about 0.01 micrometer and about 12.5 micrometers, more preferably between about 0.1 micrometer and about 5 micrometers.

After depositing the electrically conductive ground plane layer, a blocking layer may be applied thereto. Electron blocking layers for positively charged photoreceptors allow holes from the imaging surface of the photoreceptor to migrate toward the conductive layer. For negatively charged photoreceptors, any suitable hole blocking layer capable of forming a barrier to prevent hole injection from the conductive layer to the opposite photoconductive layer may be utilized. The hole blocking layer may include polymers such as polyvinylbutyral, epoxy resins, polyesters, polysiloxanes, polyamides, polyurethanes and the like. The hole blocking layer may also comprise nitrogen-containing siloxanes or nitrogen-containing titanium compounds such as trimethoxysilyl propylene diamine, hydrolyzed trimethoxysilyl propyl ethylene diamine, N-beta-(aminoethyl) gamma-amino-propyl trimethoxy silane, isopropyl 4-amino-benzene sulfonyl, di(dodecylbenzene sulfonyl) titanate, isopropyl di(4-aminobenzoyl)isostearoyl titanate, isopropyl di(4-aminobenzoyl)isostearoyl titanate, isopropyl trianthranil titanate, isopropyl tri(N,N-dimethyl-ethylamino)titanate, titanium-4-amino benzene sulfonate oxyacetate, titanium 4-aminobenzoate isostearate oxyacetate, [H$_2$N(CH$_2$)$_4$]CH$_3$Si(OCH$_3$)$_2$, (gamma-aminobutyl) methyl diethoxy-silane, and [H$_2$N(CH$_2$)$_3$]CH$_3$Si)-(OCH$_3$)$_2$ and (gamma-aminopropyl) methyl diethoxysilane, as disclosed in U.S. Pat. Nos. 4,338,387, 4,286,033 and 4,291,110. A preferred hole blocking layer comprises a reaction product between a hydrolyzed silane or mixture of hydrolyzed silanes and the oxidized surface of a metal ground plane layer. The oxidized surface inherently forms on the outer surface of most metal ground layers when exposed to air after deposition. This combination enhances electrical stability at low RH. The hydrolyzed silanes have the general formula

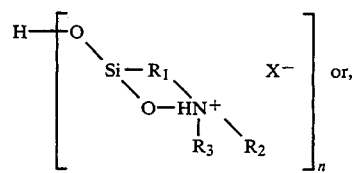

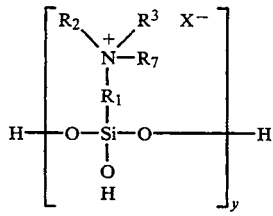

wherein R$_1$ is an alkylidene group containing 1 to 20 carbon atoms, R$_2$, R$_3$ and R$_7$ are independently selected from the group consisting of H, a lower alkyl group containing 1 to 3 carbon atoms and a phenyl group, X is an anion of an acid or acidic salt, n is 1–4, and y is 1–4. The imaging member is preferably prepared by depositing on the metal oxide layer of a metal conductive layer, a coating of an aqueous solution of the hydrolyzed amino-silane at pH between about 4 and about 10, drying the reaction product layer to form a siloxane film and applying an adhesive layer, and thereafter applying electrically operative layers, such as a photogenerating layer and a hole transport layer, to the adhesive layer.

The blocking layer should be continuous and have a thickness of less than about 0.5 micrometer because greater thicknesses may lead to undesirably high residual voltage. A hole blocking layer of between about 0.005 micrometer and about 0.3 micrometer is preferred because charge neutralization after the exposure step is facilitated and optimum electrical performance is achieved. A thickness of between about 0.03 micrometer and about 0.06 micrometer is preferred for optimum electrical behavior. The blocking layer may be applied by any suitable conventional technique such a spraying, dip coating, draw bar coating, gravure coating, silk screening, air knife coating, reverse roll coating, vacuum deposition, chemical treatment and the like. For convenience in obtaining thin layers, the blocking layer is preferably applied in the form of a dilute solution, with the solvent being removed after deposition of the coating by conventional techniques such as by vacuum, heating and the like. Generally, a weight ratio of blocking layer material and solvent of between about 0.05:100 to about 0.5:100 is satisfactory for spray coating.

In most cases, intermediate layers between the blocking layer and the adjacent charge generating or photogenerating layer may be desired to promote adhesion. For example, the adhesive layer may be employed. If such layers are utilized, they preferably have a dry thickness between about 0.001 micrometer to about 0.2 micrometer. Typical adhesive layers include film-forming polymers such as polyester, du Pont 49,000 resin (available from E.I. du Pont de Nemours & Co.), Vitel PE-100 (available from Goodyear Rubber & Tire Co.), polyvinylbutyral, polyvinyl-pyrrolidone, polyurethane, polymethyl methacrylate, and the like.

Any suitable charge generating (photogenerating) layer may be applied to the adhesive layer. Examples of materials for photogenerating layers include inorganic photoconductive particles such as amorphous selenium, trigonal selenium, and selenium alloys selected from the group consisting of selenium-tellurium, selenium-tellurium-arsenic, selenium arsenide; and phthalocyanine pigment such as the X-form of metal-free phthalocyanine described in U.S. Pat. No. 3,357,989; metal phthalocyanines such as vanadyl phthalocyanine and copper phthalocyanine; dibromoanthanthrone; squarylium; quinacridones such as those available from du Pont under the tradename Monastral Red, Monastral Violet and Monastral Red Y; dibromo anthanthrone pigments such as those available under the trade names Vat orange 1 and Vat orange 3; benzimidazole perylene; substituted 2,4-diamino-triazines such as those disclosed in U.S. Pat. No. 3,442,781; polynuclear aromatic quinones such as those available from Allied Chemical Corporation under the tradename Indofast Double Scarlet, Indofast violet Lake B, Indofast Brilliant Scarlet and Indofast Orange; and the like, dispersed in a film forming polymeric binder. Multi-photogenerating layer compositions may be utilized where a photoconductive layer enhances or reduces the properties of the photogenerating layer. Examples of this type of configuration are described in U.S. Pat. No. 4,415,639. Other suitable photogenerating materials known in the art may also be utilized, if desired. Charge generating layers comprising a photoconductive material such as vanadyl phthalocyanine, metal-free phthalocyanine, benzimidazole perylene, amorphous selenium, trigonal selenium, selenium alloys such as selenium-tellurium, selenium-tellurium-arsenic, selenium arsenide, and the like and mixtures thereof are especially preferred because of their sensitivity to white light. Vanadyl phthalocyanine, metal-free phthalocyanine and tellurium alloys are also preferred because these materials provide the additional benefit of being sensitive.

Any suitable polymeric film-forming binder material may be employed as the matrix in the photogenerating layer. Typical polymeric film-forming materials include those described, for example, in U.S. Pat. No. 3,121,006. The binder polymer should adhere well to the adhesive layer, dissolve in a solvent which also dissolves the upper surface of the adhesive layer and be miscible with the copolyester of the adhesive layer to form a polymer blend zone. Typical solvents include tetrahydrofuran, cyclohexanone, methylene chloride, 1,1,1-trichloroethane, 1,1,2-trichloroethane, trichloroethylene, toluene, and the like, and mixtures thereof. Mixtures of solvents may be utilized to control evaporation range. For example, satisfactory results may be achieved with a tetrahydrofuran to toluene ratio of between about 90:10 and about 10:90 by weight. Generally, the combination of photogenerating pigment, binder polymer and solvent should form uniform dispersions of the photogenerating pigment in the charge-generating layer coating composition. Typical combinations include polyvinylcarbazole, trigonal selenium and tetrahydrofuran; phenoxy resin, trigonal selenium and toluene; and polycarbonate resin, vanadyl phthalocyanine and methylene chloride. The solvent for the charge generating layer binder polymer should dissolve the polymer binder utilized in the charge generating layer and be capable of dispersing the photogenerating pigment particles present in the charge generating layer.

The photogenerating composition or pigment may be present in the resinous binder composition in various amounts. Generally, from about 5 percent by volume to about 90 percent by volume of the photogenerating pigment is dispersed in about 10 percent by volume to about 95 percent by volume of the resinous binder. Preferably from about 20 percent by volume to about 30 percent by volume of the photogenerating pigment is dispersed in about 70 percent by volume to about 80 percent by volume of the resinous binder composition. In one embodiment, about 8 percent by volume of the photogenerating pigment is dispersed in about 92 percent by volume of the resinous binder composition.

The photogenerating layer generally ranges in thickness from about 0.1 micrometer to about 5.0 micrometers, preferably from about 0.3 micrometer to about 3 micrometers. The photogenerating layer thickness is related to binder content. Higher binder content compositions generally require thicker layers for photogeneration. Thicknesses outside these ranges can be selected, providing the objectives of the present invention are achieved.

Any suitable and conventional technique may be utilized to mix and thereafter apply the photogenerating layer coating mixture to the previously dried adhesive layer. Typical application techniques include spraying, dip coating, roll coating, wire wound rod coating, and the like. Drying of the deposited coating may be effected by any suitable conventional technique such as oven drying, infrared radiation drying, air drying and the like, to remove substantially all of the solvents utilized in applying the coating.

The charge transport layer may comprise any suitable transparent organic polymer or non-polymeric material capable of supporting the injection of photogenerated holes or electrons from the charge generating layer and allowing the transport of these holes or electrons through the organic layer to selectively discharge the surface charge. The charge transport layer not only serves to transport holes or electrons, but also protects the photoconductive layer from abrasion or chemical attack, and therefore extends the operating life of the photoreceptor imaging member. The charge transport layer should exhibit negligible, if any, discharge when exposed to a wavelength of light useful in xerography, e.g. 4000 Angstroms to 9000 Angstroms. The charge transport layer is normally transparent in a wavelength region in which the photoconductor is to be used when exposure is effected therethrough to ensure that most of the incident radiation is utilized by the underlying charge generating layer. When used with a transparent substrate, imagewise exposure or erasure may be accomplished through the substrate with all light passing through the substrate. In this case, the charge transport material need not transmit light in the wavelength region of use. The charge transport layer in conjunction with the charge generating layer is an insulator to the extent that an electrostatic charge placed on the charge transport layer is not conducted in the absence of illumination.

The charge transport layer may comprise activating compounds or charge transport molecules dispersed in normally electrically inactive film-forming polymeric materials for making these materials electrically active. These charge transport molecules may be added to polymeric materials which are incapable of supporting the injection of photogenerated holes and incapable of allowing the transport of these holes. An especially preferred transport layer employed in multilayer photoconductors comprises from about 25 percent to about 75 percent by weight of at least one charge-transporting aromatic amine, and about 75 percent to about 25 percent by weight of a polymeric film-forming resin in which the aromatic amine is soluble.

The charge transport layer is preferably formed from a mixture comprising at least one aromatic amine compound of the formula:

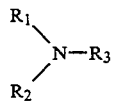

wherein $R_1$ and $R_2$ are each an aromatic group selected from the group consisting of a substituted or unsubstituted phenyl group, naphthyl group, and polyphenyl group and $R_3$ is selected from the group consisting of a substituted or unsubstituted aryl group, an alkyl group having from 1 to 18 carbon atoms and a cycloaliphatic group having from 3 to 18 carbon atoms. The substituents should be free from electron-withdrawing groups such as $NO_2$ groups, CN groups, and the like. Typical aromatic amine compounds that are represented by this structural formula include:

I. Triphenyl amines such as:

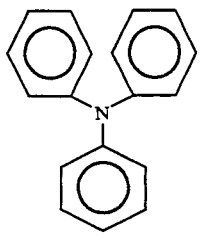

II. Bis and poly triarylamines such as:

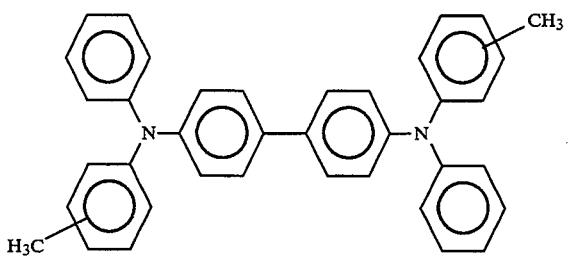

III. Bis arylamine ethers such as:

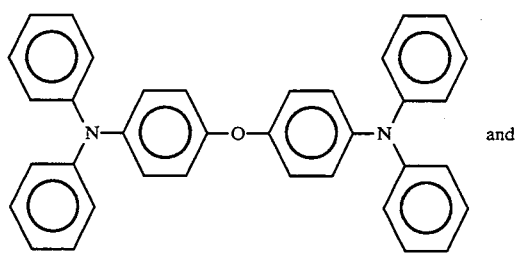

and

IV. Bis alkyl-arylamines such as:

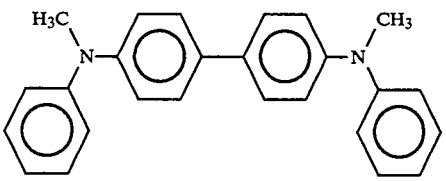

A preferred aromatic amine compound has the general formula:

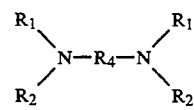

wherein $R_1$ and $R_2$ are defined above, and $R_4$ is selected from the group consisting of a substituted or unsubstituted biphenyl group, a diphenyl ether group, an alkyl group having from 1 to 18 carbon atoms, and a cycloaliphatic group having from 3 to 12 carbon atoms. The substituents should be free from electron-withdrawing groups such as $NO_2$ groups, CN groups, and the like.

Examples of charge-transporting aromatic amines represented by the structural formulae above include triphenylmethane, bis(4-diethylamine-2-methylphenyl)-phenylmethane; 4,4'-bis(diethylamino)-2,2'-dimethyltriphenylmethane; N,N'-bis(alkylphenyl)-(1,1'-biphenyl)-4,4'-diamine wherein the alkyl is, for example, methyl, ethyl, propyl, n-butyl, etc.; N,N'-diphenyl-N,N'-bis(3-methylphenyl)-(1,1'biphenyl)-4,4'-diamine; and the like, dispersed in an inactive resin binder.

Any suitable inactive resin binder soluble in methylene chloride or other suitable solvents may be employed. Typical inactive resin binders soluble in methylene chloride include polycarbonate resin, polyvinylcarbazole, polyester, polyarylate, polyacrylate, polyether, polysulfone, and the like. Molecular weights can vary from about 20,000 to about 1,500,000. Other solvents that may dissolve these binders include tetrahydrofuran, toluene, trichloroethylene, 1,1,2-trichloroethane, 1,1,1-trichloroethane, and the like.

The preferred electrically inactive resin materials are polycarbonate resins having a molecular weight from about 20,000 to about 120,000 more preferably from about 50,000 to about 100,000. The materials most preferred as the electrically inactive resin material are poly(4,4'-dipropylidene-diphenylene carbonate) with a molecular weight of from about 35,000 to about 40,000, available as Lexan 145 from General Electric Company; poly(4,4'-isopropylidene-diphenylene carbonate) with a molecular weight of from about 40,000 to about 45,000 available as Lexan 141 from General Electric Company; a polycarbonate resin having a molecular weight of from about 50,000 to about 100,000, available as Makrolon from Farbenfabricken Bayer A.G.; a polycarbonate resin having a molecular weight of from about 20,000 to about 50,000, available as Merlon from Mobay Chemical Company; polyether carbonates; and 4,4'-cyclohexylidene diphenyl polycarbonate. Methylene chloride solvent is a desirable component of the charge transport layer coating mixture for adequate dissolving of all the components and for its low boiling point.

An especially preferred multilayer photoconductor comprises a charge generating layer comprising a binder layer of photoconductive material and a contiguous hole transport layer of a polycarbonate resin material having a molecular weight of from about 20,000 to about 120,000, having dispersed therein from about 25 to about 75 percent by weight of one or more compounds having the formula:

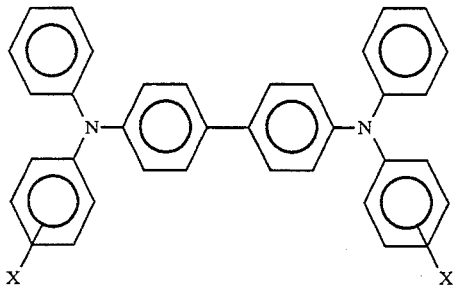

wherein X is selected from the group consisting of an alkyl group, having from 1 to about 4 carbon atoms, and chlorine, the photoconductive layer exhibiting the capability of photogeneration of holes and injection of the holes, the hole transport layer being substantially non-absorbing in the spectral region at which the photoconductive layer generates and injects photogenerated holes but being capable of supporting the injection of photogenerated holes from the photoconductive layer and transporting the holes through the hole transport layer.

The thickness of the charge transport layer may range from about 5 micrometers to about 100 micrometers, and preferably from about 10 micrometers to about 35 micrometers. Optimum thicknesses may range from about 15 micrometers to about 25 micrometers.

In accordance with a preferred method for preparing a dielectric receiver having a conductive layer and a dielectric layer, a polymer layer containing nucleating agent is electrodeposited on the electroforming surface of a female mandrel to form a belt. A metal layer is then deposited on the inside surface of the belt to form a dielectric receiver. The thicknesses of both the polymer layer and the conductive layer are selected depending upon the desired application. Preferably, the polymer layer has a thickness of from about 12.5 micrometers to about 250 micrometers, most preferably from about 50 micrometers to about 100 micrometers. The conductive layer preferably is of a thickness of from about 0.01 micrometer to about 12.5 micrometers, most preferably from about 0.1 micrometer to about 5 micrometers.

EXAMPLE I

A conductive seamless belt 3.3 inches in diameter and 4.0 inches long was prepared by mixing 400 ml Kynar 202 ® (density=1.34 gm/ml) and 400 ml propylene carbonate (density=1.2 gm/ml) in a 1000 ml beaker for 30 minutes, and then adding 0.8 grams palladium chloride, 2 ml HCl (density=1.187 gm/ml) and 5 ml methanol (density=0.796 gm/ml), to form an electrodeposition liquid. This provided weight percentages in the electrodeposition liquid of 52.39% Kynar 202 ® (20.01% PVDF), 0.39% methanol, 0.23% HCl, 0.08% $PdCl_2$ and 46.91% propylene carbonate. The mandrel for preparing the belt was a nickel sleeve with a wall thickness of about 6 mils and a length sufficient so that it extended above the level of the dispersion. The mandrel was coated with a F-544/F-546 release coating. A stainless steel rod with a diameter of 0.5 in. was used as the counterelectrode. A Kepco Model JQE O-100 V 0-A laboratory power supply (available from Kepco Inc.) was used to electrodeposit the polymer dispersions to form the seamless belts. The voltage was 75 volts and a current of 60 mA was measured during a deposition time of 3 minutes.

The film was then coalesced and dried at 210° C. for 20 minutes in a Blue M OV 490A-1 oven (available from Blue M Co.) to remove solvent. The coalesced film was dark in color due to the higher concentration of palladium chloride. The thickness was 3 mils. Some loose powdered palladium chloride was found on the surface of the film and it was buffed off. The powder was in contact with the mandrel surface. Apparently the $PdCl_2$ deposited in a large amount. It was apparent that a large amount of the palladium chloride had migrated to the anode. Also, a segment of this film was pumiced to expose more embedded palladium chloride. The PVDF film with palladium chloride was immersed in Euplate NI-414B electroless nickel bath for about 1 min. for autocatalytic plating with nickel. The nickel electrolessly deposited on the surface of this sample in some localized areas. An attempt was made to etch the PVDF with concentrated sulfuric acid to expose more palladium chloride but this did not have an effect. An ohmmeter was used to check the conductivity of the nickel film and it measured zero resistance across the longest dimension of the nickel on the PVDF film. This indicates that the metal film is sufficiently conductive and acceptable.

EXAMPLE 2

Example 1 was repeated, except that the electrodeposition voltage was 100 volts, and a current of 6.7 mA was measured. The deposition time was 3 min. The coalescence and drying was done as in Example 1.

Electroless deposition of metal on belts formed by electrodepositing liquid including PVF and palladium chloride was not demonstrated, because the palladium chloride tended to migrate to the anode. However, it is theorized that either (1) a different material could be substituted for palladium chloride, the different material having the capability of migrating to the cathode, (2) a different nucleation material could be used which would migrate to the cathode, or (3) the pulse plating could be periodically reversed with D.C., R.F. and or A.C. so as to alternate the anode and cathode. Option (3) may involve a varying duty cycle superimposed with A.C., R.F. and/or D.C. to cause the nucleating agent to migrate to the sleeve electrode. Also, other nucleating agents which have a lower tendency to migrate to the anode may be employed in order to overcome this problem.

It is to be understood that the present invention is not limited to the specific embodiments described herein. It will be appreciated by those skilled in the art that additions, modifications, substitutions and deletions may be made without departing from the scope of the invention defined in the appended claims.

What is claimed is:

1. A process for fabricating a substrate comprising the steps of:
   a) immersing a molding article having an electrically conductive molding surface in an electro-deposition liquid comprising polymer particles and nucleating material;
   b) electrodepositing a coating on said molding surface;

c) coalescing said coating to form the substrate containing said nucleating material; and;

d) exposing said substrate to an electroless metal plating bath.

2. A process as recited in claim 1, wherein said molding article comprises a mandrel and said substrate comprises a seamless endless belt.

3. A process as recited in claim 1, wherein said step of exposing said substrate comprises removing said substrate from said molding article, immersing said substrate in the electroless metal plating bath and electrolessly depositing metal from said bath onto said substrate.

4. A process as recited in claim 3, wherein said molding article comprises a mandrel and said substrate comprises a seamless endless belt.

5. A process as recited in claim 1, wherein said molding surface comprises nickel.

6. A process as recited in claim 1, wherein said polymer particles comprise fluoropolymer particles.

7. A process as recited in claim 6, wherein said fluoropolymer particles comprise at least one compound selected from the group consisting of polyvinyl fluoride and polyvinylidene fluoride.

8. A process as recited in claim 1, wherein said polymer particles comprise fluoropolymer particles and said process further comprises coating said molding article with a release coating prior to immersing said molding article.

9. A process as recited in claim 1, wherein said nucleating material comprises palladium chloride.

10. A process as recited in claim 1, wherein said electrodeposition liquid further comprises at least one acid.

11. A process as recited in claim 10, wherein said at least one acid comprises hydrochloric acid.

12. A process as recited in claim 1, wherein said coating is electrodeposited to a thickness of from about 2.5 to about 4 mils.

13. A process as recited in claim 1, wherein said metal plating bath comprises salts of at least one element selected from the group consisting of nickel, copper and chromium.

14. A process as recited in claim 13, wherein said plating bath comprises nickel salt.

15. A process as recited in claim 1, wherein said plating bath comprises a solution of a metal salt and a reducing agent.

16. A process as recited in claim 15, wherein said metal salt comprises nickel.

17. A process as recited in claim 3, wherein said metal is electrolessly deposited to a thickness of from about 0.01 to about 12.5 micrometers.

18. A process as recited in claim 1, further comprising pumicing said substrate prior to said exposing.

* * * * *